Patented Aug. 21, 1945

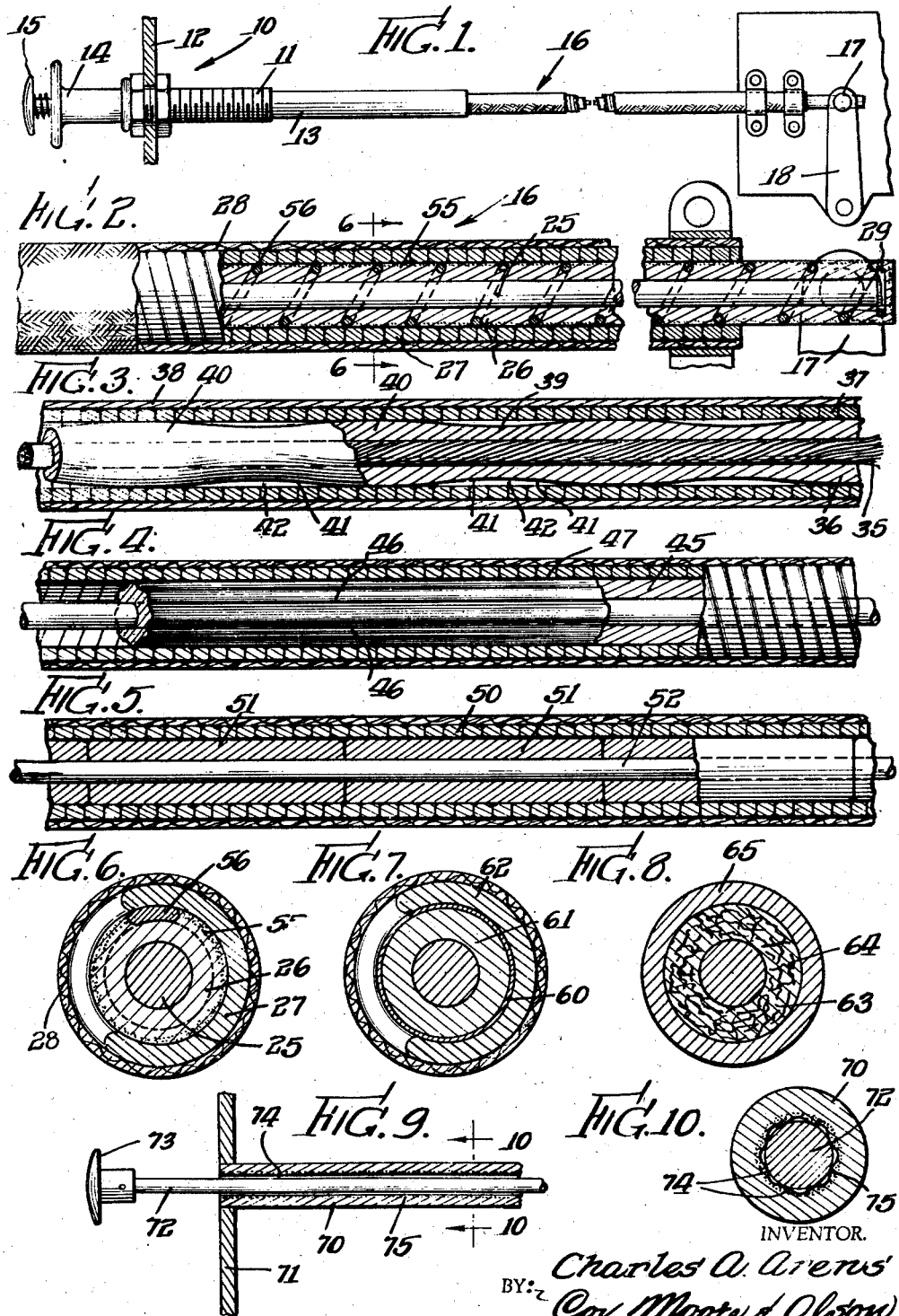

2,382,966

UNITED STATES PATENT OFFICE 2,382,966

TRANSMISSION CABLE

Charles A. Arens, Chicago, Ill., assignor to Arens Controls, Inc., Chicago, Ill., a corporation of Illinois Application May 3, 1941, Serial No. 391,632

8 Claims. (Cl. 74—501)

This invention relates to cable constructions, and more particularly to transmission cables of the type adapted for mechanical power transmission.

It is an object of the invention to provide a new and improved transmission cable, of new and improved construction, and of improved operating characteristics.

More specifically, it is an object of the invention to provide a transmission cable construction, for the transmission of mechanical power, which is more positive and responsive in its control movements, which is more uniform in its movements, wherein weight and frictional resistance to motion of the parts is reduced to a minimum, and which is of increased durability.

A further object of the invention is to provide in a transmission cable construction, improved means for protecting and reinforcing the central core or operating member, and for adapting the same for the transmission of compressive stresses.

Various other objects, advantages and features of the invention will be apparent from the following specification when taken in connection with the accompanying drawing wherein certain preferred embodiments are set forth for purposes of illustration.

In the drawing:

Fig. 1 is a general assembly view of a control mechanism installation incorporating a transmission cable constructed in accordance with the principles of the invention;

Fig. 2 is a longitudinal view, partly in section, and on an enlarged scale, of the transmission cable as constructed in accordance with one embodiment of the invention;

Fig. 3 is a view similar to Fig. 2, but illustrating a modified embodiment;

Figs. 4 and 5 are views, also similar to Fig. 2, but illustrating further modified forms of structure;

Fig. 6 is a transverse sectional view through the cable, on a further enlarged scale, and showing the construction in accordance with one embodiment of the invention;

Figs. 7 and 8 are views similar to Fig. 6 but illustrating modified embodiments; and Figs. 9 and 10 are longitudinal sectional and transverse sectional views, respectively, of a still further form of cable construction, Fig. 10 being taken on the line 10—10 of Fig. 9.

Referring more specifically to the drawing, and first to Fig. 1 thereof, it will be seen that the transmission cable of the invention has been shown as applied for use with a control mechanism of the "push-pull" type, as the invention in certain of its features and aspects is particularly adapted for uses of this character. It is to be understood, however, that the invention, in other of its aspects and features may be adapted for other uses, and that the transmission cable is applicable to the transmission of mechanical power forces and movements, generally, including rotary as well as longitudinal motions. As illustrated, the control mechanism, generally indicated by the numeral 10, comprises a main frame member or sleeve 11 secured to a support 12, an operating member 13, a main handle structure 14, and a release button or the like 15 associated with the handle. The operating member 13 is longitudinally reciprocable within the frame sleeve 11, the operating member being movable to its various adjusted positions by means of the handle 14, upon depression of the release button 15. The structure of the control mechanism may, for example, be of the general type illustrated in the patent to C. A. Arens, No. 2,161,661, dated June 6, 1939, and entitled Holding or locking device.

The operating member 13 is secured to one end of the transmission cable, generally indicated by the numeral 16, the other end of the cable being pivotally connected, as indicated at 17, to a device 18 to be controlled. The operated device may be any mechanism, the position of which is to be adjustably controlled, and it will be seen that by movement of the operating member 13 to its various shifted positions, through the transmission cable 16, the operated device 18 is moved to and retained in the desired adjusted position.

The transmission cable, as constructed in accordance with one preferred embodiment of the invention, is illustrated in detail in Fig. 2. As shown, the cable comprises a central metal wire core member 25, a non-metallic sleeve member 26 embracing the core, a sheath 27 embracing the sleeve, and a covering 28 for the sheath structure. In accordance with the invention, the non-metallic sleeve member 26 is preferably formed of that class of materials known as plastics, or the like, whereas the sheath 27 may be a convoluted, helically wound, metal wire coil. The outer cover 28 may be a lacquer-impregnated fabric braid.

The plastic sleeve 26 may be formed on the core member 25 by the application of a plurality of coatings, for example as described in the application of C. A. Arens, filed January 25, 1941, Serial No. 375,903, and entitled Cable processing apparatus and method, or it may be formed on the core member in a single operation, for example, by extrusion. But in either event, in accordance with the invention, the material of the sleeve is intimately associated with and bonded to the exterior surface of the core member. During operation of the structure the sleeve and the core member remain united as a unit, and move as a unit longitudinally within the sheath 27. To further integrally unite the core member and sleeve, the end of the core member may be headed or enlarged by upsetting as indicated at 29, Fig. 2, the upset or headed core member end being imbedded in the body of the plastic material.

As stated, during the operation of the structure, the core member 25 and the sleeve 26 form the movable or power transmission elements, being adapted for longitudinal sliding motion as a unit within the housing sheath 27. The metal wire 25 is adapted to resist pulling or tension stresses to which the elements 25 and 26 are subjected in operation, whereas the non-metallic or plastic sleeve 26 is adapted to resist compressive stresses. Moreover, due to the intimate association between the core 25 and the sleeve 26, the sleeve being in firm embracing relation with the core member on its entire exterior surface, the core member is also rendered a compression-resisting element. It will further be noted that the sleeve 26, being in effect adhesively secured to or united with the core member, forms a moisture-proof and dirt-impregnable covering for the core member, preventing the rusting or other moisture-induced deterioration of the core.

The plastic sleeve 26 also provides an improved bearing engagement with the housing sheath 27 to accommodate the longitudinal sliding movements of the power transmitting elements or structure. To this end it will be noted that the exterior surface of the sleeve is of smooth cylindrical contour, so that regardless of the interstices formed by the helical convolutions of the wire coil 27, a smooth sliding engagement between the sleeve 26 and the sheath 27 is provided. There is no possibility of jamming or sticking of the parts, and a smooth and uniform operation is insured.

Still further it will be noted that the sleeve 26, when taken with the integrally united core member 25, completely fills the space within the sheath 27 so that as the power transmitting elements are subjected to compression there is no yielding, springing or sponginess in the structure. Resultingly, an accurate correlation of movement of all parts of the power transmitting structure is provided, permitting the accurate positioning of the controlled device through small increments of movement, and even when associated with a relatively long transmission cable structure.

Also, the non-metallic sleeve, being interposed between the central core wire and the other metallic parts of the cable, acts as an insulating means therebetween preventing electrolytic action with its resulting disadvantages in cable operation and use.

The sleeve 26 is constructed of a plastic, or the like, which is of high resistance to crushing so as to absorb compression, and which is non-brittle or of sufficient flexibility so that limited bending of the transmission cable may be effected, as is required in the use of cable constructions of the type described.

In Fig. 3 an embodiment of the invention is illustrated, generally similar to that shown in Fig. 2, but wherein the central metallic core member 35 is of stranded wire rather than of solid wire as in Fig. 2, and wherein the plastic power transmitting sleeve 36 is of undulating exterior contour to provide decreased areas of contact against the interior wall surface of the sheath 37. In this instance also the outer covering 38 for the sheath may be of plastic rather than of lacquer-impregnated braid as described in reference to Fig. 2.

Referring to the embodiment of Fig. 3, while the core member 35 is of stranded wire, it will nevertheless serve as a compression resisting core contrary to the action ordinarily to be expected with stranded wire, due to the intimate bond and encasement for the wire provided by the plastic sleeve 36, this action having been previously described in reference to Fig. 2. In certain installations a stranded form of core wire may be preferable due to its greater flexibility, thus permitting the transmission cable to be bent more sharply in installation and use.

The undulated exterior contour of the sleeve 36, while not interfering with the reinforcement of the core, provides reduced areas of contact between the sleeve and the sheath 37, thus providing reduced frictional resistance to movement of the sleeve in the operation of the structure. While reduced areas of contact between the sleeve and the sheath are thus provided, it is contemplated that the sleeve 36 shall continue in its function as a compression-receiving member, and to this end it will be noted that the sections 39 of reduced size are only slightly smaller than the contact sections 40 of larger size, the sleeve 36 preferably being formed substantially in the proportions indicated in the drawing. Any possibility of buckling of the sleeve within the sheath, due to compression, is precluded. It will further be noted that the progressively increasing and decreasing dimensions of the sleeve are so arranged as to produce undulations of smooth and gradual wave-like form, so that while reduced areas of contact are provided between the sleeve and the sheath 37, these areas still are of sufficient magnitude so as to preclude any possibility of jamming or sticking of the parts. More particularly, the sleeve surfaces, such as indicated at 41, Fig. 3, are in the nature of guiding surfaces. The construction is rendered self-cleaning, and reservoirs or the like 42 are provided for the reception of any dirt, ice, or other foreign matter which may find its way into the cable construction. They also have utility as storage chambers for lubricant.

In Fig. 4 an embodiment is illustrated wherein the plastic sleeve 45, instead of being of progressively increasing and decreasing size longitudinally, as in Fig. 3, is so molded exteriorly as to present longitudinally extending rib portions 46 which contact with the interior surface of the housing sheath 47. The ribs 46 provide decreased areas of contact against the sheath 47, thus minimizing frictional resistance to movement, as in the embodiment previously described, and the action of the cable is believed to be clear from what has hereinbefore been stated.

In Fig. 5 an embodiment is illustrated which is substantially similar to the Fig. 2 construction, except that the plastic sleeve slidable within the housing sheath 50 is in this instance made up of a plurality of individual elements 51, each of the elements being in tight embracing relation with the core wire 52 and cooperating therewith in the manner previously described. The construction of the plastic sleeve of individual elements may in certain instances be desired, by way of example, when the cable construction is to be relatively sharply bent.

In Fig. 6 a transverse sectional view of the cable is set forth, by way of illustrative example through the cable construction of Fig. 2 and on the line 6—6 thereof. An important feature of the invention contemplates that the cable construction shall be self-lubricating throughout its life, and to that end the non-metallic or plastic sleeve 26 may be impregnated, particularly adjacent its outer surface as indicated at 55, with suitable lubricant means, for example, graphite or the like. The imbedded graphite or other lubricant facilitates the relative movement between the sleeve 26 and the sheath by providing lubrication, and due to the fact that the lubricant is imbedded within the material of the non-metallic sleeve, continuous and automatic lubrication throughout the life of the construction is provided.

As illustrated in Figs. 2 and 6, the plastic sleeve 26 also has imbedded therein along its exterior surface, a metal wire 56, provided for the purpose of increasing the wear-resistance of the sleeve in its sliding movements within the sheath 27. This wire, which may be of relatively light gauge and have a relatively long lead or pitch, as illustrated, does not materially increase the weight of the light sleeve construction, but does increase wear-resistance and provides metal-to-metal contact between the sleeve and the sheath. The wire 56, being imbedded in the material of the sleeve, does not interfere with the smooth exterior contour thereof. It is contemplated that the wire 56 will be imbedded in the sleeve as the latter is molded on the core wire 25.

As illustrated in Fig. 7, metal-to-metal contact is secured between the plastic sleeve 61 and the coiled wire sheath 62 by providing the sleeve with a plating 60 of suitable wear-resistance metal.

In Fig. 8 an embodiment is illustrated wherein the non-metallic or plastic sleeve, indicated by the numeral 63, has imbedded therewithin reinforcing elements, as indicated at 64. These reinforcing elements may be metal wires, fiber cords, fabric threads, or like suitable imbedded elements to give the sleeve body and strength. The provision of the reinforcing elements gives the sleeve greater resistance to bending and tension stresses, and also gives body thereto to aid in building it up as a sleeve-like unit upon the core wire. As shown in Fig. 8, the outer sheath, indicated by the numeral 65, is also illustrated as being of plastic rather than a metal wire coil. A plastic sheath may in certain instances be desirable where the greater strength or abrasion-resistance of the wire coil is not required or necessary, or where exceptional lightness in weight of the cable structure is to be attained.

In the hereinbefore described structures, for example, as used with the control mechanism of Fig. 1, it is contemplated that the inner metal wire core and the plastic sleeve embracing the core shall be integrally united and move as a unit within the stationary sheath structure. However, it is to be understood that if desired the central core and the plastic sleeve may be made independently movable within the sheath, for example as where the core and the sleeve are secured to and manipulated by separate operating members for either rotatable or sliding movements. While in such an arrangement the central core and sleeve would be independently movable, it is preferable that the sleeve embrace the core with a close sliding fit so as to impart the reinforcing action thereto, as heretofore described, and as is possible in the case of a molded non-metallic sleeve embracing a metal core wire.

In Figs. 9 and 10 an arrangement is set forth wherein the central metal core wire and the sleeve are independently movable relative to each other. In this particular instance the plastic sleeve is indicated at 70, being stationary and secured to a support 71, and the outer sheath being omitted. The metal core wire 72 movable within the non-metallic sleeve, by means of a handle member 73, has close fitting engagement therewith for reinforcement and protection against buckling as described. Moreover, to reduce operating friction between the parts, the interior surface of the plastic sleeve may be so molded as to provide longitudinally extending ribs or the like 74 whereby to produce reduced areas of contact between the relatively movable elements. The non-metallic sleeve may be also lubricant-impregnated, particularly adjacent its interior bearing surface as indicated at 75 for reasons as heretofore described.

It is to be understood that various features of the various embodiments may be interchangeably used, where not inconsistent. For example, lubricant may be imbedded in a plastic sleeve as formed with the contour of Figs. 3 or 4. It is also obvious that various changes may be made in the specific embodiments set forth for purposes of illustration without departing from the spirit of the invention. The invention is accordingly not to be limited to the structural embodiments shown and described, but only as indicated in the following claims.

The invention is hereby claimed as follows:

1. A transmission cable for transmitting tensile and compressive mechanical power comprising a tension resisting central metal core, a compression resisting non-metallic sleeve of substantially non-compressible material embracing and integrally united with the core and movable as a unit therewith, and a sheath embracing the sleeve and within which the sleeve and core are movable as a unit, said sleeve and core being adapted to transmit tensile and compressive forces within the range of intended use without appreciable variation in length.

2. A transmission cable for transmitting tensile and compressive mechanical power comprising a tension resisting central metal core wire, a compression resisting non-metallic sleeve of substantially non-compressible material embracing and integrally united with the core wire and movable therewith, and a sheath comprising a cylindrically coiled metal wire embracing the sleeve, the sleeve and core wire being slidable as a unit within the sheath, said sleeve and core being adapted to transmit tensile and compressive forces within the range of intended use without appreciable variation in length.

3. A transmission cable for transmissing tensile and compressive mechanical power comprising a tension resisting central metal core, a compression resisting non-metallic sleeve of substantially non-compressible material embracing and integrally united with the core and movable as a unit therewith, and a sheath embracing the sleeve and within which the sleeve and core are movable as a unit, said sleeve and core being adapted to transmit tensile and compressive forces within the range of intended use without appreciable variation in length, the exterior surface of the sleeve being shaped to provide reduced areas of contact for sliding engagement with the sheath.

4. A transmission cable as defined in claim 3 wherein the exterior surface of the sleeve is provided with longitudinally extending ribs whereby to present spaced areas for sliding contact with the interior sheath surface.

5. A transmission cable as defined in claim 1, wherein lubricating material is imbedded within the material of the non-metallic sleeve, to facilitate the shifting thereof.

6. A transmission cable for transmitting mechanical power comprising a tension-resisting central metal core, a compression-resisting non-metallic sleeve of substantially non-compressible material embracing and molded upon the core and movable as a unit therewith, reinforcing elements provided within the body and material of the non-metallic sleeve, and a sheath embracing the sleeve and within which the sleeve and core are movable as a unit.

7. A transmission cable for transmitting mechanical power comprising a central metal elongated core wire, a non-metallic sleeve of molded substantially non-compressible material embracing the core wire along the length thereof, and a metal wire helically imbedded in the non-metallic sleeve along the surface thereof to increase the wear resistance of the sleeve, said sleeve having close fitting engagement with the exterior surface of the core wire along the length thereof whereby the sleeve serves as a reinforcing means for the core wire and renders the wire adaptable to receive stresses of compression.

8. A transmission cable as defined in claim 1. wherein said sleeve is formed of plastic molded directly upon the core.

CHARLES A. ARENS.